United States Patent Office 3,598,880
Patented Aug. 10, 1971

3,598,880
METHOD FOR PRODUCING ISOPRENE
Yoshiki Komiyama and Akira Tasaka, Ibaragi-shi, Japan, assignors to Sumitomo Chemical Co., Ltd.
No Drawing. Filed Aug. 28, 1968, Ser. No. 755,777
Claims priority, application Japan, Sept. 7, 1967, 42/57,648; Sept. 12, 1967, 42/58,857
Int. Cl. C07c 11/18
U.S. Cl. 260—680R
13 Claims

ABSTRACT OF THE DISCLOSURE

Propylene is reacted with benzene in the presence of an alkylation catalyst. The resultant isopropylbenzenes having 1 to 3 isopropyl groups are reacted with ethylene in the presence of an alkali metal and a promotor. The resulting t-amyl-benzenes having 1 to 3 t-amyl groups are subjected to silica-catalyzed thermal decomposition to give methylbutenes and benzene which can be recycled to the step (1). The methylbutenes are dehydrogenated in the presence of a dehydrogenation catalyst to obtain isoprene. A high yield of isoprene is achieved. The benzene can be recycled without any significant consumption.

---

This invention relates to a method for producing isoprene. More particularly, it relates to a method for producing isoprene from readily available propylene and ethylene. This invention further relates to a method for producing methylbutenes from t-amyl-benzenes.

Isoprene is a very important chemical substance. It is especially useful as a raw material in the manufacture of synthetic rubber. Heretofore isoprene has been produced from propylene and ethylene. Propylene and ethylene are presently both readily available and inexpensive. This is due to the fact that the petroleum industry is currently undergoing a period of prosperity. Propylene is reacted with triethylaluminum to give diethylpentylaluminum. The diethylpentylaluminum is then reacted with ethylene at a high temperature to give 2-methyl-1-butene. The 2-methyl-1-butene is then converted into isoprene by dehydrogenation. This known method and its analogue has essentially two defects: i.e. (1) The yield obtained is low. This is due to the production of large amounts of by-products having more or less than 5 carbon atoms; and (2) the third reactant, triethylaluminum, required in this method is expensive and is also dangerous because of its easy combustibility. Accordingly, there is a need to improve the reaction yield and to substitute for the said triethylaluminum a less expensive and more convenient material.

Applicants herein have found that benzene can be used in place of the disadvantageous triethylaluminum. Further applicants have also found that when triethylaluminum is replaced by benzene the reaction yield is unexpectedly improved. The present invention is based on this finding. In addition, applicants have been able to predominantly produce methylbutenes containing as a main component 2-methyl-2-butene from t-amylbenzenes. This has been accomplished by thermally decomposing t-amyl-benzenes in the presence of silica gel. This also falls within the scope of the present invention.

Thus, a basic object of the present invention is to embody a method for producing isoprene. Another object of this invention is to embody a method for producing isoprene substantially from propylene and ethylene. A further object of the invention is to embody an economically advantageous method for producing isoprene. A still further object of the invention is to embody a method for converting t-amylbenzenes predominantly into methylbutenes. These and other objects will be apparent to those conversant with the art to which the present invention pertains from the following descriptions.

The method of the present invention may be illustrated by the following reaction steps;

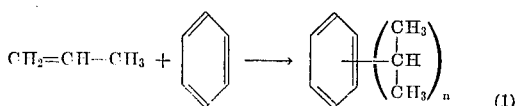
(1)

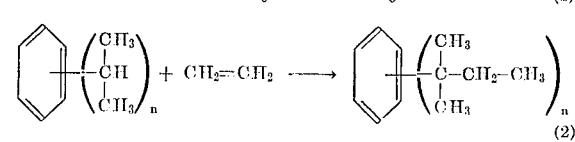
(2)

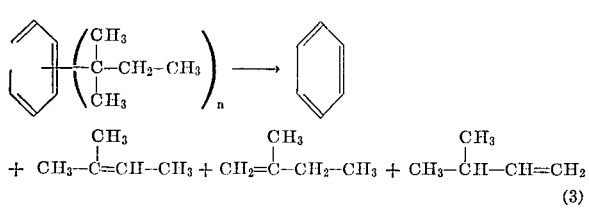
(3)

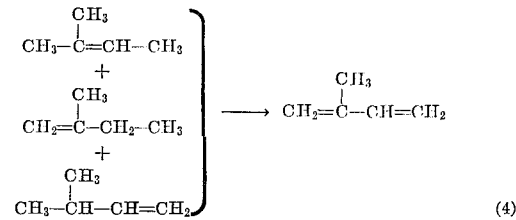
(4)

wherein $n$ is an integer from 1 to 3.

The step (1) is an interaction of propylene with benzene, i.e. an alkylation of benzene. This reaction is carried out in the presence of an alkylation catalyst such as a mineral acid or an aluminum halide. Examples of the mineral acid include sulfuric acid and phosphoric acid. Examples of the aluminum halide include aluminum fluoride, aluminum chloride, aluminum bromide and aluminum iodide.

The reaction temperature may be selected from a range of 0 to 250° C. depending upon the activity of the catalyst employed. In general, it is convenient to use an excess of benzene. The excess benzene serves as the reaction solvent. The preferred amount of catalyst is usually from 0.01 to 5 molar equivalents based on the amount of propylene. The reaction can be performed under atmospheric pressure. However, when a reaction temperature higher than the boiling point of the medium is used, the reaction must be conducted under pressure. Even when the reaction is carried out at atmospheric pressure, it is preferred to use a sealed vessel in order to prevent the loss of propylene. If desired, an inert solvent such as saturated hydrocarbons (e.g. pentane, hexane, cyclohexane, heptane) may be employed. The product is usually a mixture of mono-, di- and tri-isopropylbenzenes. It is not necessary to separate this mixture into its components as the mixture can be used in the subsequent reaction as is. The yield of the isopropylbenzenes from propylene usually amounts to about 95%.

The step (2) is an addition of ethylene to the above-produced isopropylbenzenes. The starting material of this step may be a mono-isopropylbenzene, a di-isopropylbenzene, a tri-isopropylbenzene or a mixture thereof. The reaction is carried out at a temperature of 180 to 300° C. and under a pressure of 5 to 100 atmospheres. The reaction is conducted in the presence of a small amount of an alkali metal and promotor. The reaction is usually completed within 1 to 10 hours depending upon the reaction conditions. The consumption of the starting isopropylbenzenes amounts to more than 90%. Examples of alkali metals which may be used as the catalyst include lithium, sodium and potassium. Sodium is generally preferred. Promotors which may be employed include anthracene, fluorene, o-chlorotoluene, o-bromotoluene, o-toluic acid and benzonitrile. When the mole number (n) of the isopropylbenzenes emploɥde is 1, the molar ratios of ethylene, the alkali metal and the promotor are preferably 0.5 to 2.0, 0.01 to 0.5 and 0.001 to 0.3, respectively. The product is a corresponding t-amyl-benzene having 1 to 3 t-amyl groups or a corresponding mixture of mono-, di- and tri-t-amylbenzenes. It is not necessary to separate the mixture of t-amyl benzenes into its components. The yield of the t-amylbenzenes from ethylene or the isopropylbenzenes usually amounts to about 95%.

The step (3) represents a silica-catalyzed thermal decomposition of the above-produced t-amylbenzene into methylbutenes. To perform this reaction, a vaporized t-amylbenzene which may be a mono-t-amylbenzene, a di-t-amylbenzene, a tri-t-amylbenzene or a mixture thereof, is passed through a catalyst bed at a space velocity of from 600 to 12,000 L./L. hr., preferably from 1,000 to 5,000 L./L. hr. If desired the vaporized t-amylbenzene is passed through the catalyst bed with a flow of an inert gas. The reaction temperature may be selected from a range of 250 to 500° C., preferable from 300 to 400° C. A commercially available silica catalyst such as silica gel may be employed as the catalyst. The silica gel should preferably contain not less than 93% by weight of silica and should have a surface of not less than 100 m.$^2$/g. A silica gel having high porosity (not less than 50%) and high heat resistance (stable even at 600° C.) is particularly suitable. The catalyst may be in any conventional form for example it may be amorphous, granular or in the form of pellets. Inert gases which may be used include for example, helium, argon, steam, carbon dioxide, etc. The concentration of the t-amylbenzenes in the inert gas may be from 5 to 50%. Although the reaction is usually carried out under a slightly pressurized condition, it can also be carried out under either a reduced pressure or at atmospheric pressure. Further, any form of the conventional procedures for the fixed catalyst bed process, the moving catalyst bed process and the fluidized catalyst bed process may be utilized in this reaction. The fixed catalyst bed system is however generally preferred because of its simplicity and ease of procedure.

The gaseous product can be easily separated from the unreacted t-amylbenzenes and the recovered benzene by cooling. The recovery of benzene is almost quantitative. The thus recovered benzene can be recycled to the step (1). The product is a mixture of methylbutenes, i.e. 2-methyl-2-butene, 2-methyl-1-butene and 3-methyl-1-butene, in which 2-methyl-2-butene is the main component. The gaseous product contains almost no by-products having more or less than 5 carbon atoms, except for a very small amount of straight chained pentenes. Therefore the need for a purification procedure is obviated. Further for the purpose of the production of isoprene, it is not necessary to separate the methylbutene components since all of them can be converted into isoprene by a dehydrogenation reaction. The yield of the methylbutenes from the starting t-amylbenzenes usually amounts to more than 90%.

The step (4) is a dehydrogenation of the above-produced methylbutenes to isoprene. This reaction is carried out at a temperature of 300 to 650° C. and in the presence of a catalyst. Catalysts which may be employed include for example iron oxide, chromium oxide, calcium nickel phosphate, chromia-alumina, ferric oxide-magnesia, bismuth molybdate and their chemical equivalents. If desired, a carrier gas such as nitrogen, air, steam or the like may be employed for dilution of the methylbutenes. The practical procedure can be effected according to a per se conventional manner. The product i.e. isoprene, may be isolated and purified by an extraction with a suitable solvent, for example acetonitrile, followed by distillation. The yield of isoprene from the starting methylbutenes usually amounts to more than 90%.

Thus, the present invention provides a new improvement which particularly serves to decrease the cost of producing isoprene. The advantages of the present invention may be summarized as follows:

(a) The total yield of the isoprene produced from ethylene or propylene amounts to about 80%, whereas that of the generally known method of relying upon triethylaluminum is from 65 to 70% at best.

(b) No complicated procedure is required. The isolation or purification of the product is achieved with ease in the respective steps and the chemical plant or apparatus can be greatly simplified.

(c) The essential starting materials, i.e. ethylene and propylene are readily available and at a low cost, because they are abundantly supplied by the petro-chemical industries.

(d) The third material, i.e. benzene, can be quantitatively recovered and fully recycled. Further, it is much less expensive and far more convenient to store and handle than the triethylaluminum employed in the typical known method.

(e) The other materials required for the present method, i.e. catalysts and promotors, are also highly economical. The alkylation catalyst for the step (1) in most cases can be recovered and further reused via a simple refinement. The alkali metal and the promotor utilized in the step (2) are each employed in very small amounts. As is well known, the silica catalyst for the step (3) is available at low cost. Further, it can be regenerated or reactivated and used repeatedly. Still further, the catalysts employed in the step (4) are also inexpensive.

(f) The products of the step (3), i.e. methylbutenes, can be utilized for other purposes, e.g. in the marcromolecular industries. The fact that the main component of the methylbutene mixture of the present invention is 2-methyl-2-butene and the content of straight chained pentenes is kept at a very small ratio should support a wide availabiilty of the product. This will also contribute to the intended economization of or reduction of costs achieved by the present method.

The method of the present invention will be illustrated in further detail by the examples which follow. It should be understood that they are presented for the purpose of illustration only and not of limitation. In these examples, temperatures are set forth in degrees centigrade and the abbreviations employed are intended to have their conventional significance.

EXAMPLE 1

(a) Preparation of cumene: 390 g. of benzene, 500 ml. of 88% sulfuric acid and 42 g. of propylene are placed in a 2 liter autoclave which is equipped with a magnetic stirrer. The mixture is stirred at 40° C. for 30 minutes. After the reaction, the organic layer is separated and subjected to distillation. 114 g. of cumene together with 312 g. of recovered benzene are obtained. The yield of cumene from propylene is 95%. The recovered benzene and sulfuric acid can be recycled.

(b) Preparation of t-amylbenzene: 114 g. of cumene, 1.9 g. of sodium and 2.8 g. of anthracene are placed into a 800 ml. autoclave equipped with a magnetic stirrer. The air in the autoclave is replaced by nitrogen and ethylene is compressed into the autoclave until the pressure becomes 40 kg./cm.$^2$ G. Then, the reaction is carried out at 200 to 210° C. for 5 hours. After cooling, the precipitates are removed by filtration and the filtrate is subjected to distillation. 9.5 g. of unreacted cumene are recovered. 126 g. of t-amylbenzene (B.P. 188–191° C.) are obtained. The yield calculated for the consumed cumene is 97%.

(c) Preparation of methylbutenes: The above-produced t-amylbenzene is diluted with nitrogen and passed through a catalyst bed of silica gel (manufactured by "Nikki Chemical Co.," commercial index "N 608") packed in a column reactor, under the following conditions:

Reaction temperature _____ 300° C.
Space velocity _____ 2,700 L./L. hr.
Concentration of t-amylbenzene in
 nitrogen _____ 40% by volume.
Pressure _____ 2 atmospheric pressure G.

By a gas-chromatographic analysis, the components of the resultant mixture are determined to be as follows:

| | Percent by weight |
|---|---|
| t-Amylbenzene | 9.4 |
| Benzene | 48.6 |
| Products having 5 or less carbon atoms | 42.0 |
| Items: | |
|     2-methyl-2-butene | 64.5 |
|     2-methyl-1-butene | 23.0 |
|     3-methyl-1-butene | 3.0 |
|     Total of methylbutenes | 90.5 |
|     Straight chained pentenes | 8.7 |
|     Products having 4 or less carbon atoms | 1.0 |

The results of the above analysis show that the consumption of t-amylbenzene is 90.6%, the yield of methylbutenes calculated for the consumed t-amylbenzene is 90.5% and the recovery of benzene is almost quantitative.

The reaction mixture is fractionated by distillation into the products having 5 or less carbon atoms (B.P. 39° C.) recovered benzene (B.P. 80° C.) and unreacted t-amylbenzene (B.P. 188–191° C.).

(d) Preparation of isoprene: The products having 5 or less carbon atoms obtained above are diluted with 10 molar equivalents of steam and brought in contact with an iron oxide-chromium oxide catalyst at 600° C. for 0.1 second. The consumption of the starting materials is 24% and the yield of isoprene calculated for the consumed methylbutenes is 92%.

Totally, the yield of isoprene is 82% when calculated for ethylene and 77% when calculated for propylene.

EXAMPLE 2

(a) Preparation of isopropylbenzenes: 78 g. of benzene, 1.3 g. of anhydrous aluminum chloride and 42 g. of propylene are placed in a 500 ml. autoclave equipped with a magnetic stirrer. The mixture is then stirred at 50° C. for 60 minutes. After the reaction, aluminum chloride is decomposed by addition of water, the organic layer is separated and subjected to distillation. 84 g. of cumene, 19.5 of diisopropylbenzene and 4 g. of triisopropylbenzene are obtained. These can be used in the subsequent step as a mixture.

(b) Preparation of t-amylbenzenes: 107.5 g. of the mixture of isopropylbenzenes obtained above, 2.0 g. of sodium and 2.2 g. of o-chlorotoluene are placed in a 800 ml. autoclave equipped with a magnetic stirrer. The air in the autoclave is replaced by nitrogen and ethylene is compressed into the autoclave until the pressure becomes 40 kg./cm.$^2$ G. Then, the reaction is carried out at 200 to 210° C. for 8 hours. After cooling, the precipitates are removed by filtration and the filtrate is subjected to distillation .127 g. of corresponding t-amylbenzenes are obtained.

(c) Preparation of methylbutenes: The above-produced t-amylbenzenes are diluted with nitrogen to make 40% volume in concentration and passed through a catalyst bed of the same silica gel as used in Example 1 at 300° C. and with a space velocity of 2,500 L./L. hr.

The gas-chromatographically determined components of the resultant mixture are as follows:

| | Percent by weight |
|---|---|
| t-Amylbenzenes | 9.4 |
| Cumene | 0.4 |
| Benzene | 47.0 |
| Products having 5 or less carbon atoms | 43.0 |
| Items: | |
|     2-methyl-2-butene | 60.1 |
|     2-methyl-1-butene | 25.0 |
|     3-methyl-1-butene | 3.0 |
|     (Total of methylbutenes | 88.1 |
|     Straight chained pentenes | 8.5 |
|     Products having 3 or 4 carbon atoms | 3.4 |

The methylbutenes are separated in a manner similar to that which is described in Example 1.

(d) Preparation of isoprene: The above-obtained methylbutene are converted into isoprene in a similar manner to that which is described in Example 1.

EXAMPLE 3

Preparation of methylbutenes from t-amylbenzene: t-Amylbenzene is diluted with nitrogen and passed through a catalyst bed of the same silica gel as used in Eample 1 which is packed in a column reactor under, the following conditions:

Reaction temperature _____ 400° C.
Space velocity _____ 2,000 L./L. hr.
Concentration of t-amyl-
 benzene in nitrogen _____ 10% by volume.
Pressure _____ 2 atmospheric pressure g.

The gas-chromatographically determined components of the resultant mixture are as follows:

| | Percent by weight |
|---|---|
| t-Amylbenzene | 0.9 |
| Products having 3 or 4 carbon atoms | * 3.8 |
| Straight chained pentenes | * 17.9 |
| Methylbutenes | * 78.3 |
| Items: | |
|     2-methyl-2-butene | 50.2 |
|     2-methyl-1-butene | 24.0 |
|     3-methyl-1-butene | 4.1 |

NOTE: The percentages accompanied by an asterisk (*) are calculated for the mixture excluding the unreacted t-amylbenzene.

What is claimed is:

1. A method for producing isoprene which comprises the steps of reacting propylene with benzene in the presence of an alkylation catalyst to produce an isopropylbenzene having 1 to 3 isopropyl groups; reacting said isopropylbenzene with ethylene in the presence of an alkali metal catalyst to produce a t-amylbenzene having 1 to 3 t-amyl groups; subjecting said t-amylbenzene to thermal decomposition in the presence of a catalyst consisting essentially of silica gel to give a methylbutene and benzene; and dehydrogenating the methylbutene in the presence of a dehydrogenation catalyst to obtain isoprene.

2. The method according to claim 1, wherein the methylbutene is selected from the group consisting of 2-methyl-2-butene, 2-methyl-1-butene, 3-methyl-1-butene and mixtures thereof.

3. A method for producing isoprene which comprises the steps of (1) reacting propylene with benzene at a temperature of 0 to 250° C. in the presence of an alkylation catalyst selected from the group consisting of mineral acids and aluminum halides to obtain an isopropylbenzene selected from the group consisting of monoisopropylbenzene, diisopropylbenzene, triiosopropylbenzene and mixtures thereof, (2) reacting the resultant isopropylbenzene with ethylene at a temperature of 180 to 300° C. under a pressure of 5 to 100 atmospheres in the presence of an alkali metal and a promotor to obtain a t-amylbenzene selected from the group consisting of mono-t-amylbenzene, di-t-amylbenzene, tri-t-amylbenzene and mixtures thereof, (3) contacting the vaporized t-amylbenzene with a catalyst consisting essentially of silica gel at a temperature of 250 to 500° C. with a space velocity of 600 to 12,000 L./L. hr to obtain a methylbutene selected from the group consisting of 2-methyl-2-butene, 2-methyl-1-butene, 3-methyl-1-butene and mixtures thereof and (4) treating the resulting methylbutene with a dehydrogenation catalyst selected from the group consisting of iron oxide, chromia-alumina, ferric oxide-magnesia, bismuth molybdate, chromuim oxide, and calcium nickel phosphate at a temperature of 300 to 650° C.

4. The method according to claim 3 wherein the benzene produced in the step (3) is recycled to the step (1).

5. The method according to claim 3, wherein the molar ratio of propylene and the alkylation catalyst is about 1:0.01–5.

6. The method according to claim 3, wherein the molar ratio of the isopropylbenzene, ethylene, the alkali metal and the promotor is about 1:05–2.0:0.01–0.5:0.001–0.3.

7. The method according to claim 3, wherein the vaporized t-amylbenzene is diluted with an inert gas before said contacting with the silica gel catalyst.

8. The method according to claim 3, wherein the contracting of the vaporized t-amylbenzene with the silica gel catalyst is effected by a fixed catalyst bed process.

9. The method according to claim 3, wherein the methylbutene is diluted with an inert gas before the treatment with the dehydrogenation catalyst.

10. A method for producing a methylbutene which comprises vaporizing a t-amylbenzene selected from the group consisting of mono-t-amylbenzene, di-t-amylbenzene, tri-t-amylbenzene and mixtures thereof and contacting the vaporized t-amylbenzene with a catalyst consisting essentially of silica gel at a temperature from 250 to 500° C. with a space velocity of 600 to 12,000 L./L. hr.

11. The method according to claim 10, wherein the methylbutene is selected from the group consisting of 2-methyl-2-butene, 2-methyl-1-butene, 3 - methyl-1-butene and mixtures thereof.

12. The method according to claim 10, wherein the vaporized t-amylbenzene is diluted with an inert gas before said contacting with the silica gel.

13. The method according to claim 10, wherein the contacting of the vaporized t-amylbenzene is effected by a fixed catalyst bed process.

References Cited

UNITED STATES PATENTS

| | | | |
|---|---|---|---|
| 2,275,312 | 3/1942 | Tinker et al. | 260—671X |
| 2,431,940 | 12/1947 | Kennedy et al. | 260—672 |
| 2,721,886 | 10/1955 | Pines et al. | 260—668 |
| 2,860,173 | 11/1958 | Jones et al. | 260—671 |
| 3,268,610 | 8/1966 | Bloch | 260—672 |
| 3,315,006 | 4/1967 | Alexander et al. | 260—680 |

OTHER REFERENCES

Thomas et al., Jour. Amer. Chem. Soc., vol. 66 (1944) pp. 1694–1696.

Greensfelder et al., Ind. & Engr. Chem., vol. 37 (1945) pp. 1168–1176.

PAUL M. COUGHLAN, JR., Primary Examiner

U.S. Cl. X.R.

260—672R, 683R